United States Patent [19]
Kao

[11] Patent Number: 5,366,775
[45] Date of Patent: Nov. 22, 1994

[54] EASE-PEELING AND SAFE-DISPENSING TAPE ROLL FOR PACKING OR SEALING

[75] Inventor: Cheng-Kang Kao, Sanchung, Taiwan, Prov. of China

[73] Assignee: Four Pillars Enterprise (M) SDN. BHD., Selangor Darul Ehsan, Malaysia

[21] Appl. No.: 63,223

[22] Filed: May 12, 1993

[51] Int. Cl.⁵ .......................... B32B 3/02; B32B 3/10
[52] U.S. Cl. ........................... 428/40; 428/43; 428/137; 428/195; 428/202; 428/352; 428/906
[58] Field of Search ............... 428/43, 40, 906, 137, 428/352, 195, 202; 427/208.6

[56] References Cited

U.S. PATENT DOCUMENTS

| | | | |
|---|---|---|---|
| 2,914,167 | 11/1959 | Holtz | 428/352 |
| 3,143,208 | 8/1964 | Sizemore | 428/43 |
| 4,647,485 | 3/1987 | Nelson | 428/43 |

*Primary Examiner*—Alexander S. Thomas
*Attorney, Agent, or Firm*—Browdy and Neimark

[57] ABSTRACT

An easy-peeling and safe-dispensing tape roll for packing or sealing purpose is provided with a roll of continuous tape the rear side of which is provided with a layer of release coating and the opposite side thereof coated with a layer of adhesive. The tape is provided with a strip-like area at the middle of the lateral span thereof having no adhesive applied thereto, and the strip-like area is also provided with a plurality of spaced punch holes of various shapes, such as linear or circular and etc., so as to facilitate an operator to relocate and peel off the starting end of the cut tape each time in one aspect and to make the tape easily torn off with bare hands without a cutting blade of a dispenser in another aspect.

11 Claims, 3 Drawing Sheets

EASE-PEELING AND SAFE-DISPENSING TAPE ROLL FOR PACKING OR SEALING

BACKGROUND OF THE INVENTION

The present invention relates to an improved easy-peeling and safe-dispensing tape roll adapted for packing or sealing purposes are is characterized in that the tape is easily peeled off and torn apart without using a cutting blade and is dispensed silently without any annoying noise.

Tape rolls have become indispensable in offices and factories and places of the like in daily operation for packing or fixing or sealing purpose. The conventional tape rolls are made by first coating the surface of a continuous plastic film with adhesive and then rolling the same up into rolls. The plastic film used in the prior art tape rolls is made of bi-oriented Polypropylene (BOPP) film. Such bi-oriented film can be made relatively thin, with thickness among $20\mu$–$60$ $\mu$, and transparent sealing tape with improved tensile strength, and will be prevalent in consumers' markets in the future. The strength of this kind of sealing tape is so good that the tearing apart of the tape with bare hands is hardly possible, so a cutting blade or a mount with a cutting knife has to be used to cut off the sealing tape repeatedly in practical operation. This makes the use of a sealing tape inconvenient and unsafe.

As illustrated in FIGS. 5, 6, there are two prior art sealing tapes available in the market, the first one as shown in FIG. 5, is produced by laterally cutting a sealing tape into a plurality of equal continuous unit strips having one end thereof marked with color so as to facilitate a person to peel off the unit strips for handy use. But this kind of prior art sealing tape still has some disadvantages in practical use, for instance, the unit strip is of a constant length and any other size tape can not be obtained therefrom; and the printing of regular commercial wordings thereon is hardly possible.

The second prior art sealing tape as shown in FIG. 6 is provided with continuous spaced notches at one edge of the tape so as to facilitate the tearing apart of the tape. If this kind of prior art tape is not specially treated, for example, by coating with a release agent or keeping the rim of the tape free from coating a layer of adhesive, the notches can only make the tape made from BOPP easily broken when peeling off as a result of improper application of force to the tape, Furthermore, in such case, notches disposed at both edges can only make it worse in practice without offering any facility at all. Moreover, the prior art sealing tape is coated with a layer of adhesive on one side thereof without further treatment so that the peeling off the tape needs a little effort and produces annoying noise in addition. The relocation and the handling of the starting end of a conventional sealing tape is sometimes frustrating.

SUMMARY OF THE INVENTION

Therefore, the primary object of the present invention is to provide an improved easy-peeling safe-dispensing sealing tape roll which is coated with a layer of an release agent on the back side thereof, opposite to the adhesive-coated side, so as to permit the tape to be peeled off with ease; and the effortless peeling-off of the tape makes the tape not so violently vibrate in one aspect and produces less static electricity in another, resulting in the effective reduction of annoying noise in dispension.

Another object of the present invention is to provide an improved easy-peeling safe-dispensing packing tape roll which is provided with a strip-like area at the middle thereof to which no adhesive is applied so as to permit the tape to be easily peeled off in one aspect, and to facilitate a person to relocate the starting end of a cut tape in next dispension of the tape.

One further object of the present invention is to provide an improved easy-peeling safe-dispensing packing or sealing tape roll which is made from bi-oriented polypropylene film with the middle of the continuous tape roll provided with a strip area on which are disposed a plurality of punch holes of various shape, such as linear or circular figure, so as to effectively reduce the tearing resistance of the tape, permitting the same to be easily torn apart with the help of the punch holes without use of a cutting blade in one aspect, and to be protected from accidental breaking in tape dispension as a result of reduction of unwinding force of the tape.

DETAILED DESCRIPTION OF THE PREFERRED EMBODIMENTS

Figures 1, 1A:
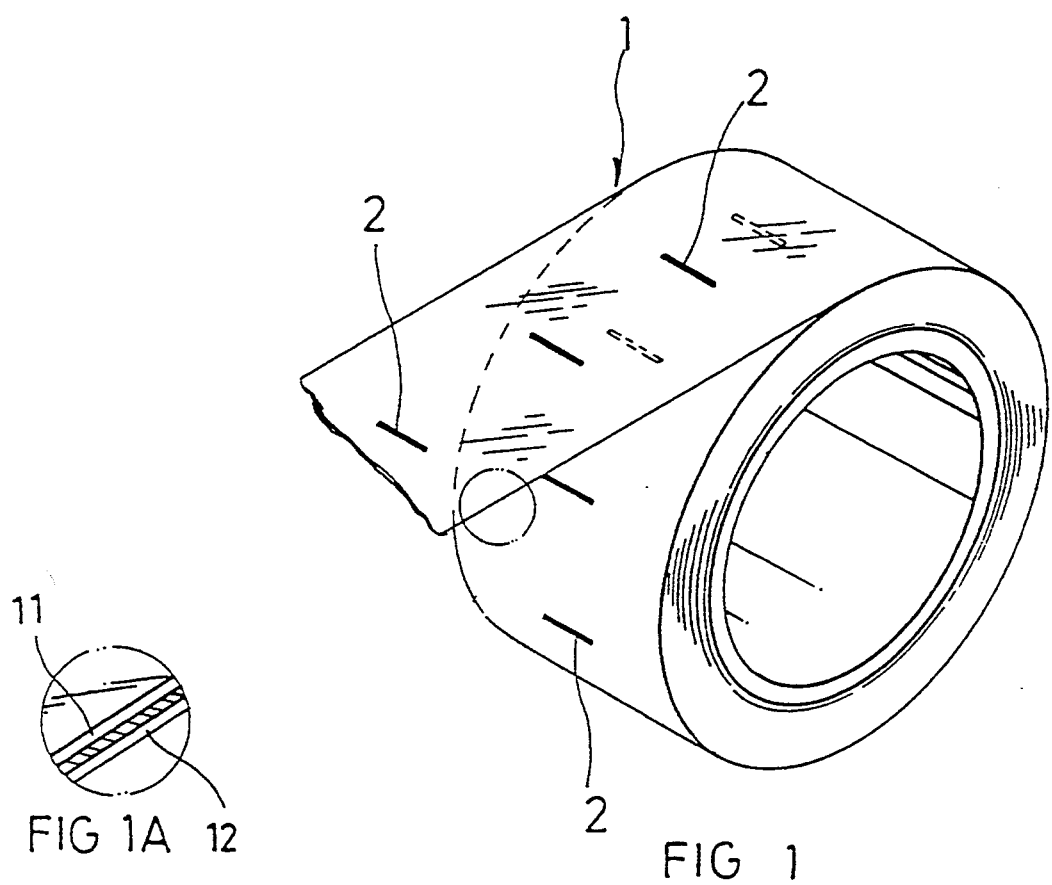
FIG. 1 is a perspective view of the structure of the present invention.
FIG. 1A is an enlarged diagram showing the detailed structure thereof.

Referring to FIG. 1, the tape roll of the present invention is made from a continuous film obtained from the bi-oriented polypropylene ( BOPP ) film which is hard to tear apart. In production of the tape roll, the middle of the same is provided with a plurality of evenly spaced punch holes 2 of various shapes ( such as linear, circular and etc.). The lateral yielding strength around the punch holes 2 is substantially lowered so as to permit the tape to be easily torn apart thereat without use of a cutting blade.

Figure 2:
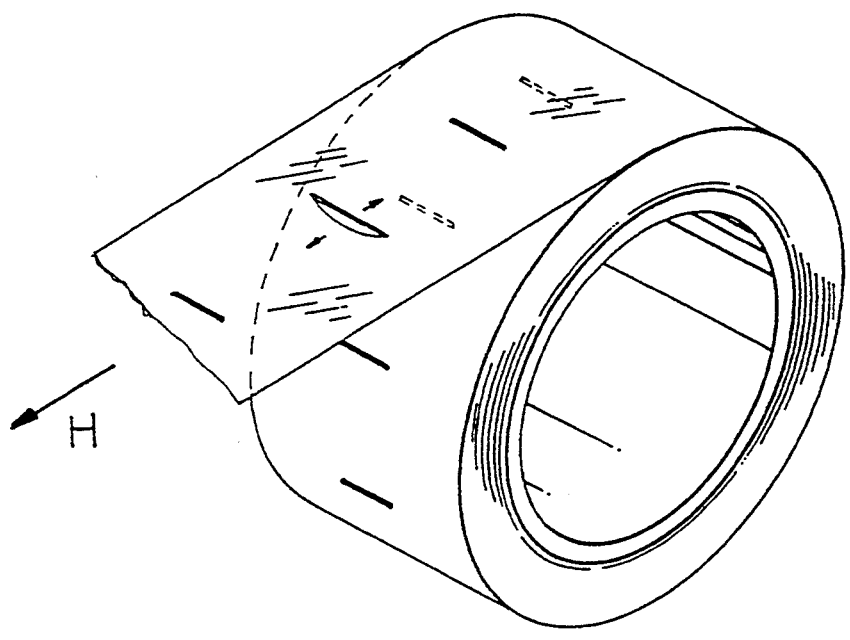
FIG. 2 is a diagram showing the present tape roll being dispensed with the punch hole easily expanded so as to facilitate a person to tear the tape apart.
Figures 3, 3A:
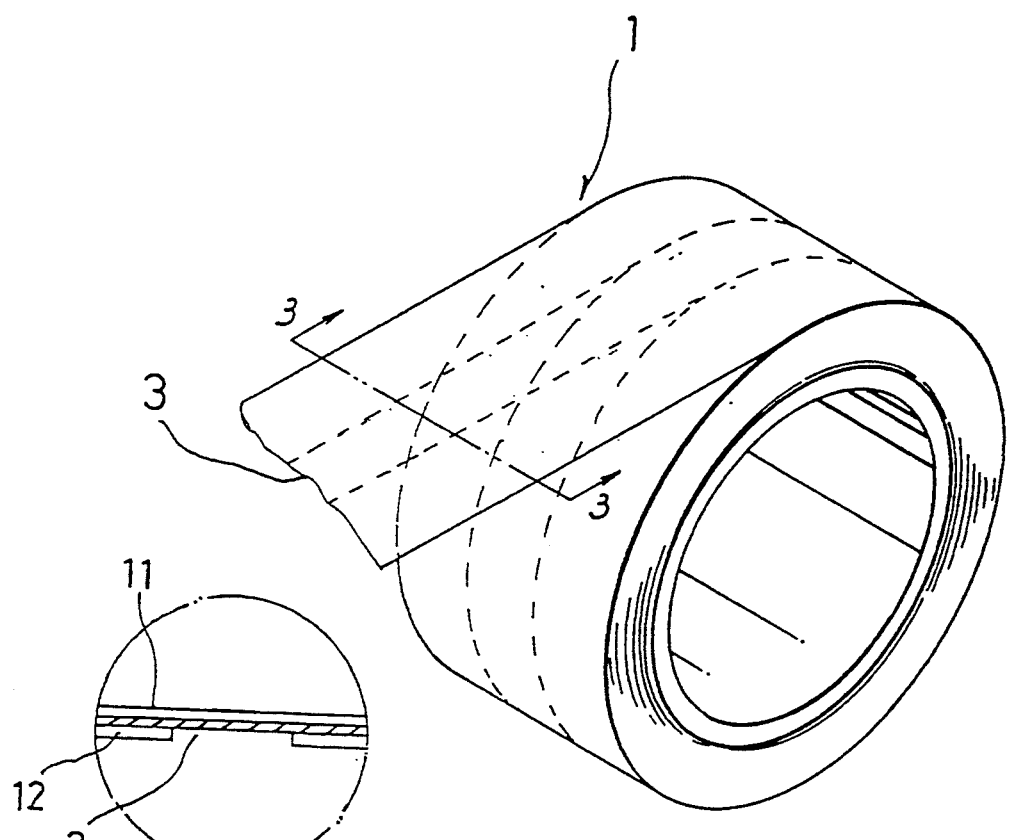
FIG. 3 is another embodiment of the present invention.
FIG. 3A is a sectional diagram of FIG. 3 along line 3A—3A.

To prevent the outwardly extended tape of the present invention from being easily broken in dispension as a result of the provision of the punch holes which reduce the lateral yielding strength of the tape, the tape roll is provided with a layer of release coating on the back side 11 thereof, opposite to the adhesive-coated side 12, so as to make the adhesive-coated side 12 to be easily peeled off the back side 11, as shown in FIG. 3A. So the tape will not be accidently broken at an improper position in dispension, as shown in FIG. 2.

Referring to FIG. 2, the dispension of a tape of the present invention is illustrated. In practice, the tape is first dispensed to a proper length, then a person can apply slight force around a punch hole 2 with fingers and the tape is outwardly extended in the direction indicated by the letter H at the same time so as to permit the tape to be easily torn apart without use of a cutting blade. The so dispensed tape section is tightly adhered to the surface of a bag, a carton or objects of the like, so the punch holes will not affect the strength of the applied tape.

As the back side of the tape roll is coated with a layer of release agent, the rolled up tape with the adhesive coated side in close abutment against the back side can be easily and smoothly peeled off in dispension without producing any annoying noise as a result of the effective reduction of vibration and tension of the dispensed tape in outward extension. Moreover, the starting end of the cut tape roll of the present invention can be readily relocated in use for dispension due to the provision of these punch holes.

Referring to FIG. 3, another embodiment is illustrated. To the middle of the lateral span of the tape roll 1 having a strip-like area 3 is applied no adhesive so as to facilitate the peeling-off of the tape in dispension in one aspect, to make the relocation of the starting end of the cut tape in next dispension in another aspect. As shown in FIG. 3A, the side 12 coated with adhesive is divided by the strip-like area 3 having no adhesive applied thereto.

Figure 4:
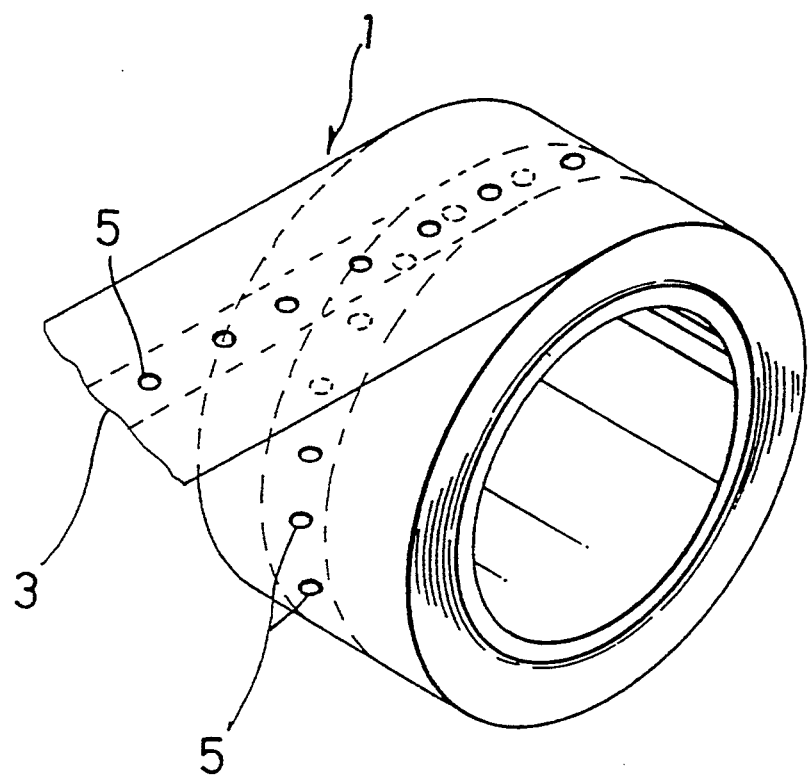
FIG. 4 is diagram showing another embodiment thereof.
Figure 5:
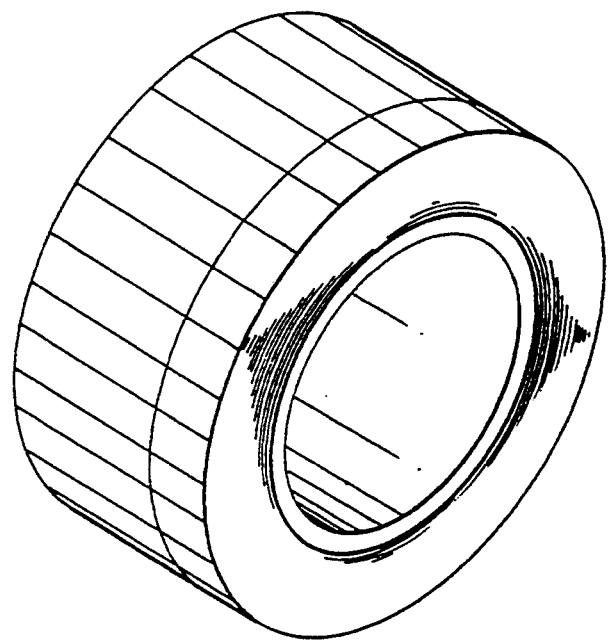
FIG. 5 is a diagram showing a prior art tape roll.
Figure 6:
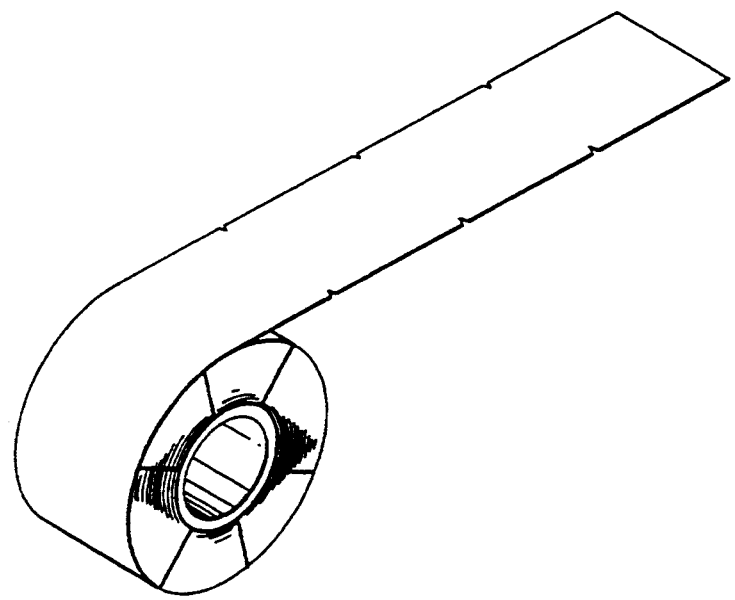
FIG. 6 is a diagram showing another prior art tape roll.

Referring further to FIG. 4, the adhesive free strip-like area 3 is provided with a plurality of equally spaced punch holes 5 which can be formed in either circular of linear shape whereby a person can easily tear the tape apart at any desired position by simply applying slight force at a particular punch hole. The present invention can be applied to sealing tape made from bi-oriented polypropylene film or can also be applied to polyester film or other plastic material suitable for the production of tape film.

I claim:

1. An easy-peeling safe-dispensing tape roll for packing or sealing purposes which is made from thin plastic film with one side thereof coated with adhesive and the opposite side thereof coated with a release agent so as to permit said tape to be easily peeled off when dispensing same and to facilitate the relocation of a starting end of the cut tape roll in next use, wherein said adhesive is present in a discontinuous layer whereby the middle of the lateral span of said side coated with adhesive is provided with a continuous strip-like area to which no adhesive is applied, wherein said continuous strip-like area is provided with a plurality of spaced punch holes so as to permit said tape to be easily torn apart at any selected position.

2. An easy-peeling safe-dispensing tape roll as claimed in claim 1 wherein said thin plastic film is made from bi-oriented polypropylene.

3. An easy-peeling safe-dispensing tape roll as claimed in claim 1 wherein said thin plastic film is made from polyester film. area to which no adhesive is applied, wherein said continuous strip-like area is provided with a plurality of spaced punch holes so as to permit said tape to be easily torn apart at any selected position.

4. An easy-peeling safe-dispensing tape roll for packing or sealing purposes which is made from a strip of thin plastic film with one side thereof coated with adhesive and the opposite side thereof coated with a release agent so as to permit said tape to be easily peeled off during dispensing thereof and to facilitate the relocation of a starting end of the cut tape roll in next use, wherein a middle zone of the lateral span of said rolled tape is provided with a single row of a plurality of longitudinally spaced punch holes constituting means permitting said dispensed tape to be easily broken off laterally at any selected punch hole when slight force is applied thereto, said spaced punch holes being elongated in the lateral direction.

5. An easy-peeling safe-dispensing tape roll as claimed in claim 4, wherein said thin plastic film is made from bi-oriented polypropylene.

6. An easy-peeling safe-dispensing tape roll as claimed in claim 4, wherein said thin plastic film is made from polyester film.

7. An easy-peeling safe-dispensing tape roll according to claim 4 wherein said single row of spaced punch holes is disposed exactly along a lateral center line spaced equidistant from opposite edges of said strip of thin plastic film.

8. An easy-peeling safe-dispensing tape roll for packing or sealing purposes which is made from a strip of thin plastic film with one side thereof coated witch adhesive and the opposite side thereof coated with a release agent so as permit said tape to be easily peeled off during dispensing thereof and to facilitate relocation of a starting end of the cut tape roll in next use, wherein a longitudinally extending row of spaced punch holes is provided along a center line of said strip of thin plastic film spaced equidistant from opposite edges thereof, said spaced punch holes constituting means permitting said dispensed tape to be easily broken off laterally at any selected punch hole when slight force is applied thereto, said spaced being elongated so as to extend laterally.

9. An easy-peeling safe-dispensing tape roll as claimed in claim 8, wherein said thin plastic film is made from bi-oriented polypropylene.

10. An easy-peeling safe-dispensing tape roll as claimed in claim 8, wherein said thin plastic film ms made from polyester film.

11. An easy-peeling safe-dispensing tape roll for packing or sealing purpose in accordance with claim 4 or 8 wherein said adhesive is present in a continuous layer over substantially the entire opposite side thereof.

* * * * *